United States Patent
Alsayegh et al.

(10) Patent No.: US 11,821,828 B1
(45) Date of Patent: Nov. 21, 2023

(54) SYSTEM AND METHOD FOR DETERMINING PHYSICAL STABILITY OF DISPERSED PARTICLES IN FLOWING LIQUID SUSPENSIONS

(71) Applicant: KUWAIT UNIVERSITY, Safat (KW)

(72) Inventors: Naser Alsayegh, Safat (KW); Amman M. Bahman, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/069,189

(22) Filed: Dec. 20, 2022

(51) Int. Cl.
  *G01N 15/02* (2006.01)
  *B01L 3/00* (2006.01)

(52) U.S. Cl.
  CPC .... *G01N 15/0272* (2013.01); *B01L 3/502761* (2013.01); *B01L 2300/0681* (2013.01); *G01N 2015/0288* (2013.01)

(58) Field of Classification Search
  CPC ........ G01N 15/0272; G01N 2015/0288; B01L 3/502761; B01L 2300/0681
  USPC ...................................... 73/863.23
  See application file for complete search history.

(56) References Cited

U.S. PATENT DOCUMENTS

| | | |
|---|---|---|
| 3,677,069 A | 7/1972 | Rubin et al. |
| 3,777,551 A | 12/1973 | Weiss |
| 5,315,863 A | 5/1994 | Cowper |
| 5,601,711 A * | 2/1997 | Sklar ................... B01D 21/262 210/232 |
| 11,353,386 B1 | 6/2022 | Asayegh et al. |
| 2007/0056390 A1* | 3/2007 | Harley ............... G01N 15/0272 73/865.5 |

(Continued)

FOREIGN PATENT DOCUMENTS

| | | |
|---|---|---|
| CN | 105043945 A | 11/2015 |
| DE | 10055420 A1 | 5/2002 |

(Continued)

OTHER PUBLICATIONS

Kawara et al., "Sieving of aerosol paricles with metal screens", Aerosol Science and Technology (2016(), vol. 50, Iss. 6, pp. 535-541.

(Continued)

*Primary Examiner* — Marrit Eyassu
(74) *Attorney, Agent, or Firm* — Nath, Goldberg & Meyer; Richard C. Litman (57) ABSTRACT

The system and method for determining physical stability of dispersed particles in flowing liquid suspensions is performed by passing a fluid with suspended particulates in a column of filter elements having progressively smaller porosities. The fluid is received by a fluid supply receptacle and then passed through the column of filter elements. The filter elements are arranged so that successive filters are downstream of each other, with successive filters having successively smaller porosities. The porosity of an initial filter element has a sufficiently large porosity to filter a largest particle size intended for detection, and a final filter element has at least a sufficiently small porosity to filter a smallest particle size intended for detection. This results in the successive filters separating successively smaller particles from the fluid. Average particle size and particle count are obtained by removing a mesh filter element and performing SEM analysis on the filtered particles.

13 Claims, 4 Drawing Sheets

(56) References Cited

U.S. PATENT DOCUMENTS

| | | | | |
|---|---|---|---|---|
| 2007/0160503 A1* | 7/2007 | Sethu | ................ | B01L 3/502761 |
| | | | | 422/400 |
| 2012/0258459 A1* | 10/2012 | Huang | ................ | B01L 3/50255 |
| | | | | 210/767 |
| 2014/0030788 A1* | 1/2014 | Chen | .................. | G01N 15/1404 |
| | | | | 435/308.1 |
| 2014/0137523 A1 | 5/2014 | Ikeda et al. | | |

FOREIGN PATENT DOCUMENTS

| | | |
|---|---|---|
| DE | 102007042109 A1 | 3/2009 |
| ES | 2188323 A1 | 6/2003 |
| FR | 2252785 A5 | 6/1975 |

OTHER PUBLICATIONS

GAYDON "Learn what to expect from centrifugal, reciprocating and rotary pumps", Hydaulic Institute (2018).

\* cited by examiner

SYSTEM AND METHOD FOR DETERMINING PHYSICAL STABILITY OF DISPERSED PARTICLES IN FLOWING LIQUID SUSPENSIONS

BACKGROUND

1. Field

The disclosure of the present patent application relates to fluid mechanics, and particularly to a system and method for determining physical stability of dispersed particles in flowing liquid suspensions, including nanofluids and microfluids, in a dynamic flow state.

2. Description of the Related Art

Often it is desired to analyze suspensions in fluids. This analysis can include segregation of particles by particle size.

In some cases, suspensions are advanced types of fluids that contain dispersed solid particles. These particles are usually in the range of nanometers (nm) to micrometers (μm) in size. The actual range would depend on the physical characteristics of the suspension, in which the suspended particles are likely to remain in suspension in a substantially static state, and in which the suspended particles are likely to remain in suspension during expected fluid flow. The maximum size of particles to be measured would be limited by filtration practices, in which larger particles can be presumed to be removed during normal fluid handling within the fluid system. Taking the example of an internal combustion lubrication system, particles above a predetermined size can be presumed to be easily blocked, whereas particles below a smaller predetermined size can be presumed to pass the filter. If the filter is examined, the larger particles may be described as the machine or engine "making metal" (indicating deterioration of bearings and other metallic components), whereas the smaller particles may be described in terms of the color of the oil or the blackening of the oil. Therefore, the range of particles to be detected is largely controlled by practical requirements, such as the physical properties, including viscosity, of the vehicle fluid (base fluid) and the known effects of particles and particle contamination in the fluid. There are also advanced fluids in which particles are intentionally added, one example being particulate friction modifiers.

When suspensions are fabricated from particles in the nanoscale they can be referred to as "nanofluids", whereas the ones made of μm dispersions can be termed as "microfluids". Such advanced types of fluids are generally targeted towards heat transfer applications (e.g., heat exchanger working fluids), but can also be utilized by the medical sector in the form of medications or inner body diagnostic fluids (e.g., radioactive technetium imaging); the petroleum industry to improve their fuel products combustion efficiency or enhance the crude oil recovery at the flooding stage; and as lubricants for mechanical parts.

Thus, a system and method for determining physical stability of dispersed particles in flowing liquid suspensions solving the aforementioned problems are desired.

SUMMARY

The system and method for determining physical stability of dispersed particles in flowing liquid suspensions is performed by passing a fluid with suspended particulates in a column or succession of filter elements having progressively smaller porosities. A fluid for detection of suspended particles carried by the fluid is received by a fluid supply receptacle. The fluid is then passed through the column or succession of filter elements, in which filter elements have specified porosities, and are arranged so that successive filters are downstream of each other, wherein the successive filters have successively smaller porosities. An enclosure is used for guiding the fluid downstream from the fluid supply, through the plurality of successive filter elements to a filtrate output. The porosity of an initial filter element has at least a sufficiently large porosity to filter a largest particle size intended for detection, and a final filter element has at least a sufficiently small porosity to filter a smallest particle size intended for detection, with the successive filters separating successively smaller particles from the fluid. The amount of particles included in the base fluid to form the suspension should not exceed two-thirds of the mesh filter's cross-sectional area so that it does not clog it if fully accumulated in any single stage. The mesh filters at the various stages are gently removed and SEM analysis is used to determine average particle size and particle count.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The system and method for determining physical stability of dispersed particles in flowing liquid suspensions presents an approach to determine quantitatively the physical stability of suspensions, including nanofluid suspensions and microfluid suspensions, in a dynamic flow state. The technique uses adjustable meshes of different porosities at multiple stages to capture the differently sized dispersed particles. The physical stability of the suspension is measured based on the resulting particle count in the mesh of large porosity, as compared to that of the mesh of small porosity.

The mesh holders include a first, uppermost holder with a mesh having a porosity larger than the dispersed particles used (e.g., 10 to 40 times larger than a single particle size), with subsequent mesh holders downstream having progressively smaller porosities. For example, the subsequent mesh holders may have their porosities progressively sized to a final lowermost mesh holder with a mesh having the porosity approximating the dispersed particle size. Also by way of example, the subsequent mesh porosities may have progressively smaller porosities until at least one of the lowermost mesh porosities is smaller than the expected dispersed particle size, which would either confirm the expected smallest particle size or provide additional information regarding particle sizes smaller than a predetermined particle size. The mesh holders between the first and final mesh holders have meshes that decrease in porosity stage by stage. The filtering is used in a liquid flow, in which the particles are suspended in a liquid flow medium.

In an open system, the output from the final stage enters an open container, while in a closed system, a pump and associated pipes direct the mixture from the final stage back to the cylindrical container. After conducting the stability experiment with a closed or an open system, the meshes are gently removed from the mesh holders and placed in a scanning electron microscopy (SEM) device for analysis.

The particle count measurements may use conventional techniques. For example, the measurement technique can include the use of scanning electron microscopy (SEM) in at least the final stage. The technique covers the dispersion stability when the suspensions flow in any system (both open and closed loop systems), and can use various techniques for driving flow. Examples of flow driving techniques can include, for example, pumped flow and natural gravitational force, and can be implemented at different flow rates.

The fabrication of the suspension may be performed within the device itself with the capability of controlling the mixture temperature, for example, by a heating/cooling jacket. The disclosed technique is more accurate than a particle size analyzer that overestimates the dispersed particle size and may count shadows of particles as actual particles. Therefore, the disclosed technique is able to provide reliability in a wide variety of applications that use suspensions, e.g., oil industry, energy sector, medical sector, micro-processor cooling, etc.

Conventionally, there are primarily two approaches to produce these suspensions. The first technique is known as the one-step (or single-step) method and the second technique is called the two-step method. In the single-step approach, the particles are formed and dispersed within the hosting fluid in a single stage. Such an approach offers a suspension has higher dispersion physical stability, and desirability, avoiding the need to deal with dry powder, its transport, and storage allocation.

However, the single-step technique is associated with residuals that are hard to remove because of incomplete reactions, and it can only be used to fabricate specific combinations of particles and base fluids.

On the other hand, the two-step method uses pre-prepared powders, after which they are added and dispersed in any non-dissolving base fluid through a mixing device. For example, of the two-step method may include use of an ultrasonicator, homogenizer, and magnetic stirring. Using this approach, there are a wide variety of types of suspension can be manufactured, it is easy to handle by users with minimum level of experience, the powders are commercially available on a wide scale, and it can be used for both small- and large-scale production. Therefore, this method of production has always been favored by many researchers in the field of advanced fluids.

Of note, some suspensions produced using the two-step approach have a lower level of dispersion physical stability than the level of dispersion physical stability obtained from the one-step method. The level of dispersion using the two-step approach can be improved to a certain extent by including surfactants in the mixture at the fabrication stage or by employing surface functionalization to the particles. Researchers have been using different methods to determine the physical stability of their fabricated suspensions, which include a sedimentation photographical capturing method; dynamic light scattering (DLS); Zeta potential analysis; 3-ω approach; scanning electron microscopy (SEM) analysis; transmitted electron microscopy (TEM) characterization; spectral analysis; centrifugation; and particle size analyzer.

Of the above techniques, a particle size analyzer is very useful in determining the physical stability of suspensions in a dynamic flow condition, which is the actual condition that any suspension would experience in any real application for which it is utilized. Nevertheless, this method of evaluation has continuously been reported to overestimate the size of the dispersed particles (by 2 nm to 10 nm higher), and occasionally overestimates the amount of particles because, in most cases, it assumes that the shadow of a particle is another particle. Due to the aforementioned facts, this technique cannot be considered as a reliable evaluation of the physical dispersion stability of any suspension.

These particle sizes may be, for example, in the range of nanometers (nm) to micrometers (μm) in size. The actual range would depend on the physical characteristics of the suspension, in which the suspended particles are likely to remain in suspension in a substantially static state, and in which the suspended particles are likely to remain in suspension during expected fluid flow. The maximum size of particles to be measured would be limited by filtration practices, in which larger particles can be presumed to be removed during normal fluid handling within the fluid system.

The particles subject to analysis may have, for example, a minimum size at a low range of 20 nm to 1000 nm, and an upper range of 1 μm to 100 μm. However, these ranges are highly dependent on the nature of the fluid, including fluid viscosity, and the environment in which the fluid is used. Higher ranges of particle size can be implemented in the system. However, it will be challenging to disperse (i.e., to form suspensions with them). Accordingly, an upper range of filtration may be selected to approximate a particle size that would correspond to a size at which a predetermined category of particles would remain dispersed in the fluid under test during a predetermined operating condition.

Taking the example of an internal combustion lubrication system, filtration by automotive oil filters typically range, for the smallest particle size, from 24 μm to 30 μm for higher quality filters, whereas some diesel filters have filtration down to 15 μm. Full flow filters typically trap debris at 30 μm, and bypass filters (or the bypass portion of a combination filter) capture contaminants down to 5 μm. For fuel, the 2020 National Institute of Standards and Technology (NIST) Handbook 130 specifies filters for diesel dispensers shall have a 30 μm or smaller nominal pore-sized filter, whereas the Fuels Institute's Diesel Fuel Quality Council (DFQC) recommends a 10 μm or smaller nominal pore-size, and many dispensers filter at 2 μm, with further filtration at the vehicle engine. For diesel filtration in the engine's fuel system, most manufacturers specify capturing contaminants 2 μm to 10 μm. Different particle size criteria apply to different automotive fuels and lubricants, and fluids used in other environments, e.g., refrigeration, will have different characteristics and different particulate ranges for analysis.

In addition to the previous dynamic evaluation method, one approach to determine the dispersion stability of particles in flowing fluids relies on linking the changes in suspension viscosity and pumping power to the agglomeration of the hosted particles. Although that technique has been demonstrated, it only provides relative measurements (i.e., it does not provide information on the formed agglomerated particle size). Therefore, it can be classified as a qualitative approach for determining the dispersed particles stability in flowing suspensions. On the other hand, the conventional SEM method is used to characterize the physical stability of suspensions at a stationary shelving condition. The approach is based on taking a sample of the mixture, directly after suspension production, then dropping this sample on the SEM sample holder, after which it is dried before conducting the SEM analysis. The reason behind explaining the previously well-known SEM method for suspension physical stability analysis is for clarification of how to differentiate between the old SEM method (used for shelved suspensions) and part of the approach used according to the disclosed technology, which implements a dynamically flowing suspension physical stability analysis.

In this context, the disclosed technology provides an approach for determining the physical stability of suspensions (both nanofluids and microfluids) in a dynamic flow state quantitatively. The disclosed technology is able to measure dispersion stability when the suspensions flow in any system due to natural gravitational force (i.e., gravity alone), and at different flow rates (resulting from the use of an attached pump).

In addition, the fabrication of the suspension may be performed within the device itself using a homogenizer (two-step method), with the capability of controlling the mixture temperature in the fabrication stage by covering the suspension container with a heating/cooling jacket. It can also be used for both open and closed loop systems, based on user preference and the physical properties of the fluid under test. The present device uses adjustable meshes of different porosities at multiple stages (based on user preference) to capture the differently sized dispersed particles. The technique uses a column of filter meshes, having progressively smaller porosities in the flow direction. For example, the mesh filters may be arranged so that successive filter meshes are positioned below each other, which facilitates a gravity feed and allows filtered particles to rest on surfaces of the filter meshes. The mesh at stage one should have a porosity larger than the dispersed particles used, whereas the porosity of the mesh in the final stage needs to have size as the dispersed particle size. For example, the larger porosity at stage one can be 10× to 40× larger than a single particle size. Furthermore, the first step is to conduct the stability experiment with or without using the pump (based on the targeted application system), after which the meshes are gently removed from the disclosed technology and placed in the SEM device. The SEM device will then be used to characterize the accumulated particles in terms of average size and particle count. Thus, if the resulting particle count in the mesh of large porosity was less than that of the mesh of small porosity, this will indicate that the dispersion is stable, and vice versa. The final stage mesh should technically show no accumulation of particles on its surface when being analyzed by the SEM device, if the employed dry particles were equal in size to the mesh pores. In the case where particles are seen on the final stage mesh, their average size can be obtained (using the SEM), after which this finding can be used to further stabilize the suspension before employing it in real life applications.

This approach facilitates measurements of several aspects of fluids with suspended particles, including determining quantitatively the physical stability of dynamically flowing nanofluids and microfluids under different flow conditions and different system configurations (i.e., closed or open loop system, and natural and forced flows); fabrication of the suspension may be performed within the device, and hence no additional mixing would be done when transferring the suspension from an external fabrication system to the stability characterization device, where any additional mixing or transferring would change the level of physical stability of the dispersion; the suspension temperature can be controlled by the user at the dispersion fabrication stage; the material used in the constructional parts of our device can be exchanged with those that are used in the actual targeted application to determine the effect of the surface roughness and wettability on the physical stability of the dispersion; and the present device is more accurate than the currently used particle size analyzer devices due to the high accuracy of the SEM analysis.

The disclosed technique can be improved by the user by increasing the number of mesh stages, but it is important to remember that the porosity of the mesh should gradually decrease after each stage up to the size of the actual particles used. This approach is useful in both the particle size analyzer device and the new technique that can determine the physical stability of suspensions at dynamic flow conditions. With the presently disclosed technology, fabrication of the suspension can be performed within the device using a homogenizer mixer. This will eliminate any additional mixing to the suspension from transferring it from an external mixing device to the examining cycle. Any additional mixing would change the level of physical stability of the dispersed particles within the suspension.

Further, suspension temperature can be controlled at the production stage using a heating/cooling jacket. The present device is more accurate than a particle size analyzer that overestimates the dispersed particle size and counts the shadow of particles as actual particles.

The parts used in the present device can be replaced with others that are made from the same material as the targeted application. Alternatively, all parts can be replaced by others made of a suitable material to eliminate the surface friction effects on the dispersed particles physical stability within the flowing suspension. For example, suitable materials can be glass or high surface finish acrylic.

Excluding the SEM device, which can be found roughly in any lab that uses dry powders, the manufacturing and construction net cost of the present device is much cheaper than most (if not all) particle size analyzer devices. The present device is useful for testing a wide variety of suspensions for any application that uses suspensions. This includes, but is not limited to, the oil industry, which may use oil extraction through flooding with suspensions, and liquid fuels that include dispersed particles for improving their combustion efficiency; energy sector: heat exchangers, solar collectors, air conditioning and refrigeration (AC&R) systems, and nuclear power reactors (for energy output and for loss-of-coolant accident); medical sector: medications in the form of suspensions, and inner body diagnostic imaging, such as suspensions made of dispersed radioactive technetium; and other applications, such as car radiators and computer processor cooling.

Figures 1A, 5:
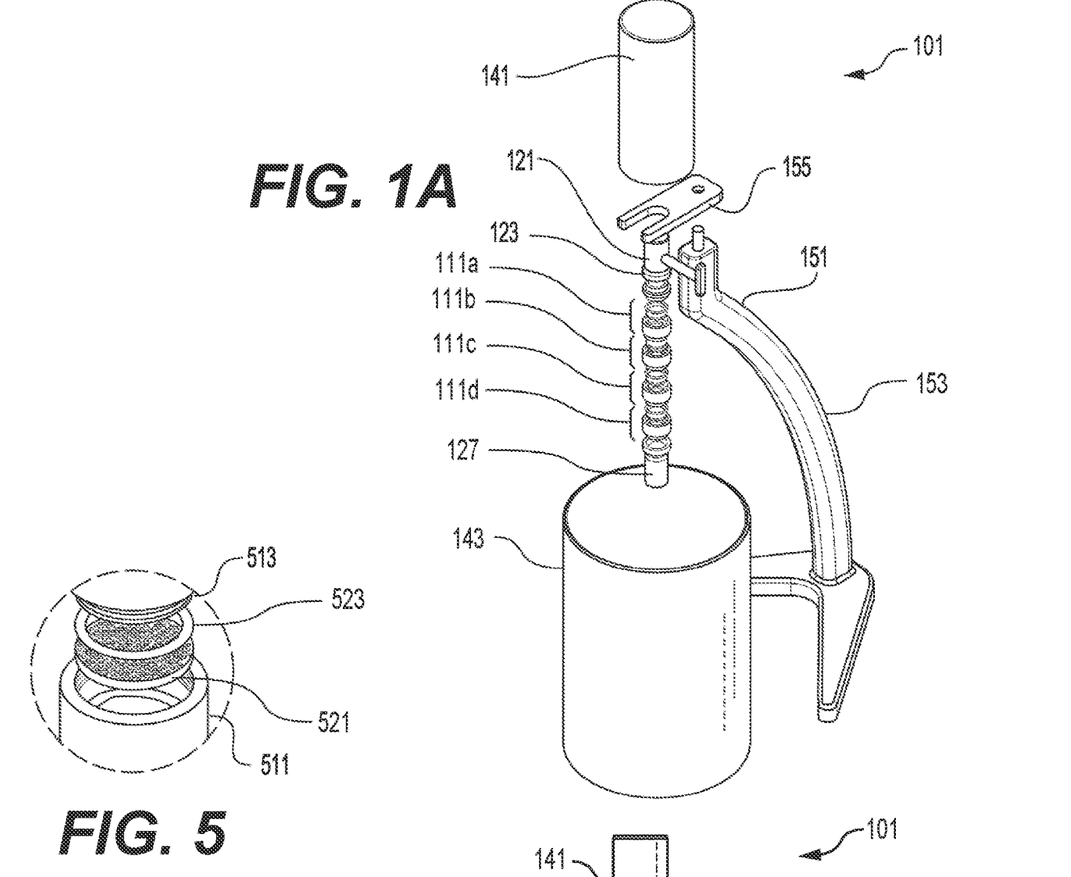
FIG. 1A is a partially exploded perspective view of a testing device in a system for determining physical stability of dispersed particles in flowing liquid suspensions, the device having an open loop full gravity feed configuration.
FIG. 5 is a detailed perspective view of a mesh assembly used in the testing devices of FIGS. 1-4.
Figure 1B:
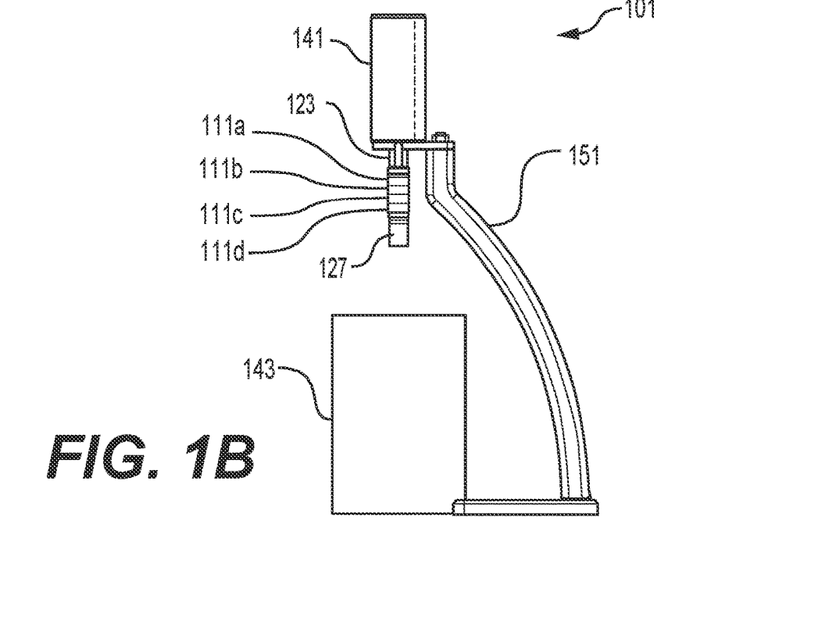
FIG. 1B is a perspective view of the testing device of FIG. 1A.

FIGS. 1A and 1B are perspective views showing a testing device 101 in a system for determining physical stability of dispersed particles in flowing liquid suspensions having an open loop full gravity feed configuration. FIG. 1A is an exploded assembly view, and FIG. 1B is an assembled view. Depicted are mesh assemblies 111a, 111b, 111c, and 111d, supply valve 121, supply valve fitting 123 and outlet fitting 127. Also shown are supply cup 141 and discharge beaker 143. A support stand 151 comprises cup holder stand 153 and supply cup holder 155.

In operation, a fluid under test with suspended particles is poured into supply cup 141 and discharged through supply valve 121 to pass through successive mesh assemblies 111a, 111b, 111c, and 111d. After passing through mesh assembly 111d, the fluid is discharged through outlet fitting 127 to discharge beaker 143.

Each mesh assembly 111a, 111b, 111c, and 111d represents a single stage and that the mesh assembly with the largest porosity is the one directly after supply cup 141, containing the suspension. The mesh porosity should then decrease gradually in each stage, as explained, supra. Furthermore, the use of four mesh assemblies 111a, 111b, 111c, and 111d is given by way of example, as the number of stages can be increased or decreased, depending on the level of accuracy that the user would like to achieve. Since this system is not reconnected to supply cup 141, which is in effect the main suspension storage, this system represents an open cycle.

Figures 2A, 2B:
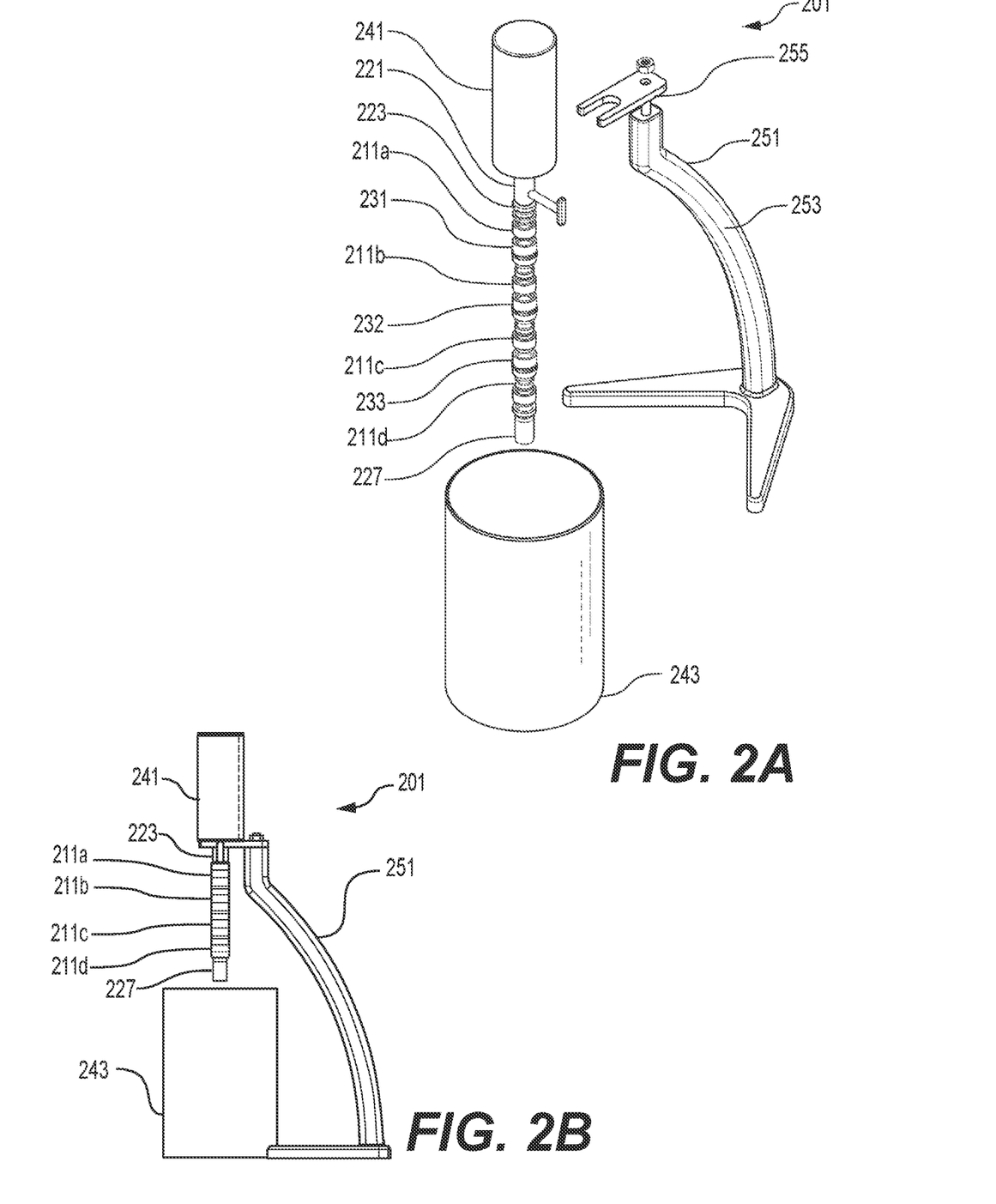
FIG. 2A is a partially exploded perspective view of a testing device in a system for determining physical stability of dispersed particles in flowing liquid suspensions, the device having an open loop full gravity feed configuration and a spaced stage arrangement.
FIG. 2B is a perspective view of the testing device of FIG. 2A.

FIGS. 2A and 2B are perspective views showing a testing device 201 in a system for determining physical stability of dispersed particles in flowing liquid suspensions having an open loop full gravity feed configuration, using a spaced stage arrangement. FIG. 2A is an exploded assembly view, and FIG. 2B is an assembled view. Depicted are mesh assemblies 211a, 211b, 211c, and 211d, supply valve 221, supply valve fitting 223 and outlet fitting 227. Stage spacers 231, 232, 233 are inserted between mesh assemblies 211a, 211b, 211c, and 211d, resulting in physical separation of the mesh assemblies 211a, 211b, 211c, and 211d. Also shown are supply cup 241 and discharge beaker 243. A support stand 251 comprises cup holder stand 253 and supply cup holder 255.

Stage spacers 231, 232, 233 allow configuration of the physical stability device 201 to allow extending the distance between the mesh assemblies 211a, 211b, 211c, and 211d, as desired. The use of the spacers is useful to allow the technician to study the effects flow of distance on the physical stability of the suspensions under test.

Figure 3A:
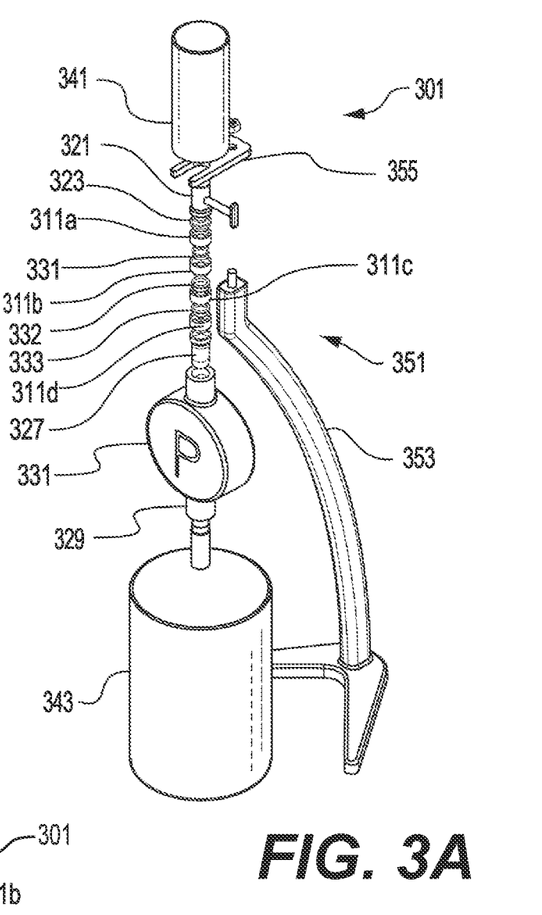
FIG. 3A is a partially exploded perspective view of a testing device in a system for determining physical stability of dispersed particles in flowing liquid suspensions, the device having an open loop full gravity and pump feed configuration.
Figure 3B:
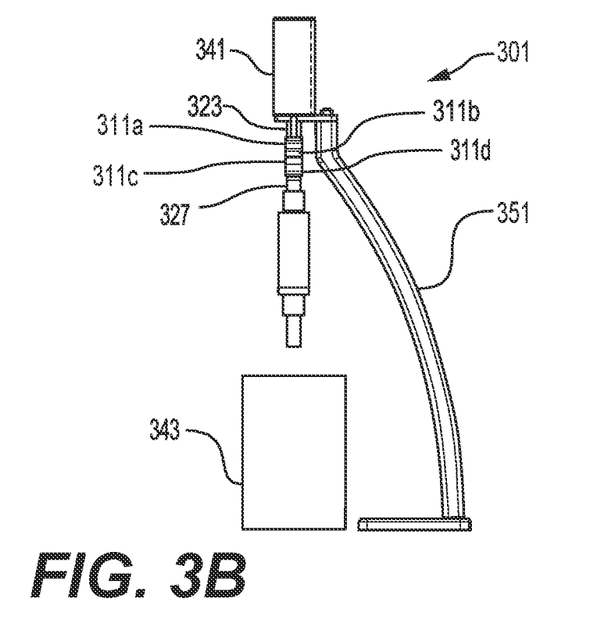
FIG. 3B is a perspective view of the testing device of FIG. 3A.

FIGS. 3A and 3B are perspective views showing a testing device 301 in a system for determining physical stability of dispersed particles in flowing liquid suspensions having an open loop gravity and pump feed configuration. FIG. 3A is an exploded assembly view, and FIG. 3B is an assembled view. Depicted are mesh assemblies 311a, 311b, 311c, and 311d, supply valve 321, supply valve fitting 323 and intermediate fitting 327. Discharge pump 331 is connected to intermediate fitting 327. Also shown are supply cup 341 and discharge beaker 343. Discharge pump 331 discharges fluid through discharge tube 329. A support stand 351 comprises cup holder stand 353 and supply cup holder 355. This configuration can be used with a spaced stage arrangement, such as depicted in FIGS. 2A and 2B.

Discharge pump 331 provides an ability to control the flow rate can be changed as desired. This helps represent the real-life application condition in which the suspension will experience. If desired or if necessary to avoid cavitation, the pump 331 can be inserted upstream of mesh assembly 311a or between mesh assemblies.

Figure 4A:
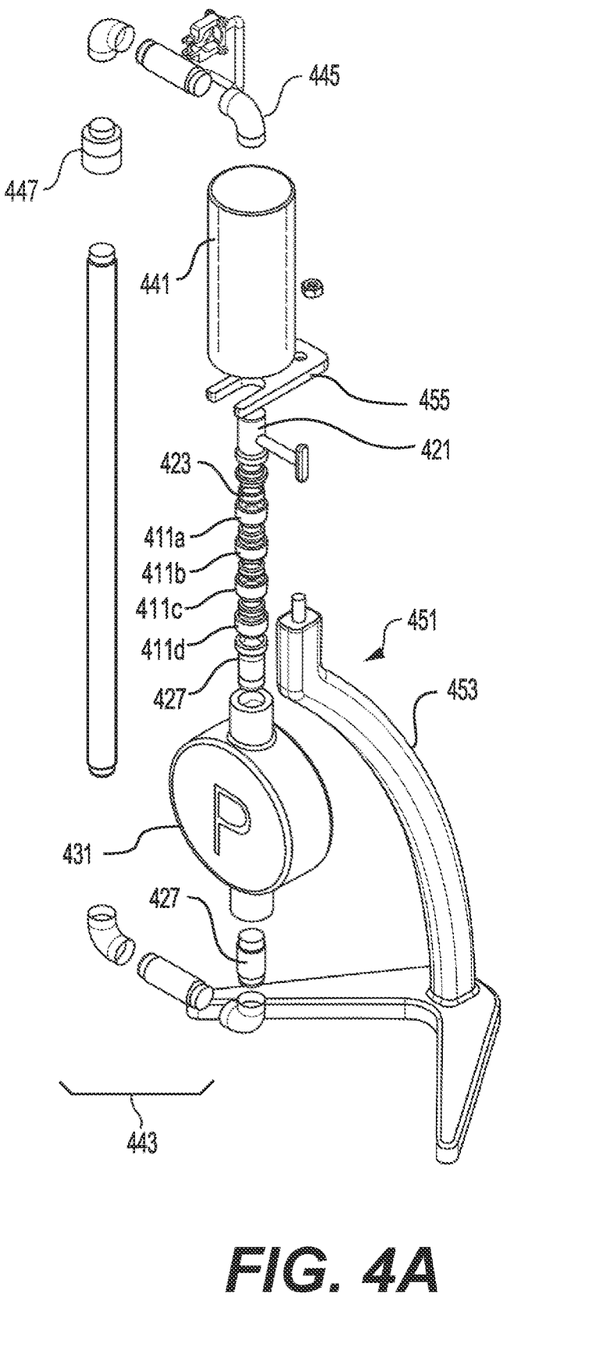
FIG. 4A is a partially exploded perspective view of a testing device in a system for determining physical stability of dispersed particles in flowing liquid suspensions, the device having a recirculating system configuration and a gravity and pump feed.
Figure 4B:
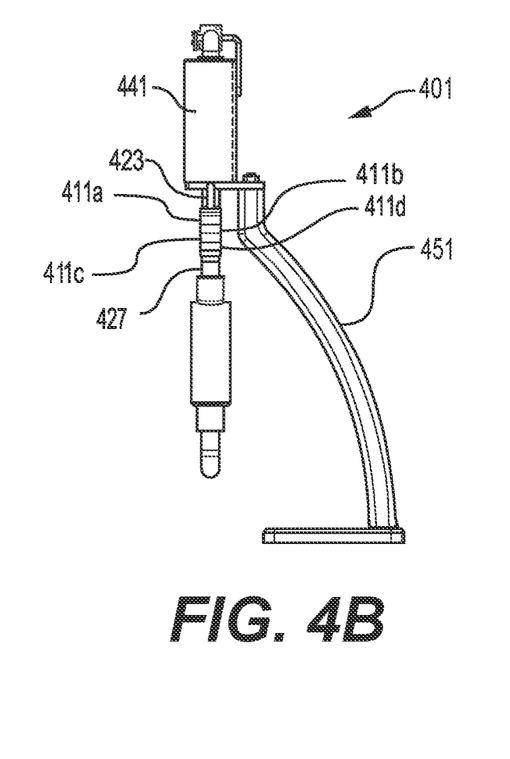
FIG. 4B is a perspective view of the testing device of FIG. 4A.

FIGS. 4A and 4B are perspective views showing a testing device 401 in a system for determining physical stability of dispersed particles in flowing liquid suspensions having a recirculating system configuration using gravity and a pump feed. FIG. 4A is an exploded assembly view, and FIG. 4B is an assembled view. Depicted are mesh assemblies 411a, 411b, 411c, and 411d, supply valve 421, supply valve fitting 423 and intermediate fitting 427. Discharge pump 431 is connected to intermediate fitting 427 and discharges fluid. Also shown is supply cup 441.

Instead of using a discharge tube, the pump output is directed to a recirculation path 443, which includes discharge tube 445, which can be pivoted toward and away from supply cup 441 by means of rotating fitting 447.

Discharge pump 431 provides an ability to control the flow rate, which can be changed as desired. This helps represent the real-life application condition which the suspension will experience. If desired or if necessary to avoid cavitation, the pump 431 can be inserted upstream of mesh assembly 411a or between mesh assemblies. This configuration can be used with a spaced stage arrangement, such as depicted in FIGS. 2A and 2B.

In operation, the arrangement provides a recirculating system configuration in which the suspension keeps cycling throughout the device 401. To initiate a test operation, one simply closes supply valve 423. After the fluid under test stops entering suspension storage, mesh assemblies 411a, 411b, 411c, and 411d are removed from the device.

FIG. 5 is a schematic diagram showing a mesh assembly used for each stage of the physical stability devices of FIGS. 1A-4B. Depicted are housing cylinder 511 and feeder cap 513. Held between the housing cylinder 511 and the feeder cap 513 is a mesh filter screen 521. A gasket or seal 523 is pressed by the feeder cap 513 against the mesh filter screen 521 to prevent leakage past the edge of the mesh filter screen 521.

Housing cylinder 511 and feeder cap 513 have tubing connection openings (not shown in FIG. 5) for initial supply feed, feed to successive filters, and output feed, as is described in connection with FIGS. 1A-4B. As described in connection with FIGS. 1A-4B, a plurality of mesh assemblies 501 are used, with successive mesh filter screen 521 having successively smaller pore sizes for the successive mesh assemblies 501.

Different types of filters can be substituted for the mesh filter screens 521. For example, porous solid materials and other types of filters can be used. It is also possible to use different forms of filters in sequential mesh assemblies, for example to test the filter media or other filter properties.

The use of a supply cup, such as supply cup 141, allows the fluid to be provided at a pressure range established by atmospheric pressure and the height of the fluid in the supply cup, as in a gravity feed system. While a supply cup, such as supply cup 141, is described, it is possible to provide direct supply from an external fluid flow system, such as a tubing system, with fluid passing directly from the external fluid flow system. The pressure can be system pressure, such as oil pressure in an engine lubrication system or other pumped system, or can be separately regulated. In the case of multi-phase fluids, a closed system or a system with pressurization is used to maintain the vehicle fluid in a preferred phase, typically liquid. An example of the use of a multi-phase fluid would include refrigeration systems, in which a refrigerant having phase change characteristics is used in a vapor-compression cycle system. Multi-phase fluids are also common in the handling of liquefied gas products, such as liquefied natural gas and other liquefied fuels and volatile liquids.

While gravity feed and pump-assisted gravity feed systems are described, it is possible to provide pressure feed systems in which the sequential mesh assemblies are not arranged with sequential mesh assemblies arranged below each other. It is also possible to allow the filters to be backflushed to clear particulates from the filters, for example, for observation without a need to disassemble the mesh assemblies for each observation.

It is to be understood that the system and method for determining physical stability of dispersed particles in flowing liquid suspensions is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A testing device for a system for determining physical stability of dispersed particles in flowing liquid suspensions, the testing device comprising:
   a fluid supply for receiving a fluid having dispersed particles therein for detection of the dispersed particles suspended in the fluid;
   a filter mesh column including a plurality of filter elements having different specified porosities, the filter elements being arranged with successive filters downstream of each other, the successive filter elements having progressively smaller porosities, including an initial filter element has at least a sufficiently large porosity to filter a largest particle size intended for detection, and a final filter element has at least a sufficiently small porosity to filter a smallest particle size intended for detection, the successive filters separating successively smaller particles from the fluid;
   a fluid output disposed below the filter mesh column;
   an enclosure guiding a flow of the fluid downstream from the fluid supply through the plurality of successive filter elements to the fluid output;
   a plurality of mesh assemblies in the filter mesh column, each of the filter elements being contained within a corresponding one of the respective mesh assemblies, the mesh assemblies each having a respective one of the filter elements and a housing, the housing retaining the filter element in a manner directing fluid passing through the mesh assembly to pass through the filter element, the housing having fluid connections for receiving the fluid from an upstream direction and discharging the fluid in a downstream direction, with the discharge subsequent to passing through one of the filter elements; and
   at least one stage spacer positioned between two of the mesh assemblies in order to separate the two mesh assemblies wherein the at least one stage spacer facilitates a study of effects that a flow of distance has on the physical stability of the flowing liquid suspension.

2. The testing device of claim 1, further comprising a pump in-line with the plurality of filter elements to drive and assist in driving fluid flow through the column.

3. The testing device of claim 2, further comprising a return line connecting the fluid output to the fluid supply, thereby providing at least partial recirculation of the fluid through the filter mesh column.

4. The testing device of claim 1, wherein the porosity of the initial filter is selected to have a porosity corresponding to an upper range of filtration selected to approximate a particle size corresponding to a size at which a predetermined category of particles would remain dispersed in the fluid under test during a predetermined operating condition.

5. A system for determining physical stability of dispersed particles in flowing liquid suspensions, the system comprising:

the testing device according to claim 1; and a scanning electron microscopy (SEM) apparatus for determining average particle size and a particle count for dispersed particles filtered out of the fluid flow by one of the filter elements removed from the filter mesh column.

6. A method for determining physical stability of dispersed particles in flowing liquid suspensions, the method comprising:

receiving a fluid for detection of suspended particles carried by the fluid;

passing the received fluid through a filter mesh column including a plurality of filter elements having different specified porosities, the filter elements being arranged with successive filters downstream of each other, the successive filter elements having progressively smaller porosities, including an initial filter element has at least a sufficiently large porosity to filter a largest particle size intended for detection, and a final filter element has at least a sufficiently small porosity to filter a smallest particle size intended for detection, the successive filters separating successively smaller particles from the fluid;

guiding the fluid downstream through the successive filter elements to a filtrate output, wherein the filter mesh column includes a plurality of mesh assemblies, each of the filter elements being contained within a corresponding one of the respective mesh assemblies, the mesh assemblies each having a respective one of the filter elements and a housing, the housing retaining the filter element in a manner directing fluid passing through the mesh assembly to pass through the filter element, the housing having fluid connections for receiving the fluid from an upstream direction and discharging the fluid in a downstream direction, with the discharge subsequent to passing through one of the filter elements; and positioning at least one stage space between two of the mesh assemblies in order to separate the two mesh assemblies wherein the at least one stage spacer facilitates a study of effects that a flow of distance has on the physical stability of the lowing liquid suspension.

7. The method for determining physical stability of dispersed particles in flowing liquid suspensions of claim 6, further comprising using a pump in-line with the plurality of filter elements to drive and assist in driving fluid flow through the column.

8. The method for determining physical stability of dispersed particles in flowing liquid suspensions of claim 7, further comprising providing at least partial recirculation of the fluid through the filter mesh column.

9. The method for determining physical stability of dispersed particles in flowing liquid suspensions of claim 6, further comprising selecting, as the porosity of the initial filter, a porosity corresponding to an upper range of filtration selected to approximate a particle size that would correspond to a size at which a predetermined category of particles would remain dispersed in the fluid under test during a predetermined operating condition.

10. A suspended particle analysis apparatus, comprising: means for receiving a fluid for detection of suspended particles carried by the fluid;
- means for passing the received fluid through a filter mesh column including a plurality of filter elements having specified porosities, the filter elements being arranged with successive filter elements having successively smaller porosities progressively downstream;
- means for guiding fluid downstream from successive filter elements to a filtrate output,
- wherein the porosity of an initial filter element has at least a sufficiently large porosity to filter a largest particle size intended for detection, and a final filter element has at least a sufficiently small porosity to filter a smallest particle size intended for detection, the successive filters separating successively smaller particles from the fluid,
- a plurality of mesh assemblies in the filter mesh column, each of the filter elements being contained within a corresponding one of the respective mesh assemblies, the mesh assemblies each having a respective one of the filter elements and a housing, the housing retaining the filter element in a manner directing fluid passing through the mesh assembly to pass through the filter element, the housing having fluid connections for receiving the fluid from an upstream direction and discharging the fluid in a downstream direction, with the discharge subsequent to passing through one of the filter elements, and
- at least one stage spacer positioned between two of the mesh assemblies in order to separate the two mesh assemblies wherein the at least one stage spacer facilitates a study of effects that a flow of distance has on the physical stability of the flowing liquid suspension.

11. The suspended particle analysis apparatus of claim 10, further comprising means for pumping fluid through the plurality of filter elements to drive and assist in driving fluid flow through the column.

12. The suspended particle analysis apparatus of claim 10, further comprising means for providing at least partial recirculation of the fluid through the filter mesh column.

13. The suspended particle analysis apparatus of claim 10, wherein the porosity of the initial filter is selected to have a porosity corresponding to an upper range of filtration selected to approximate a particle size corresponding to a size at which a predetermined category of particles would remain dispersed in the fluid under test during a predetermined operating condition.

* * * * *

UNITED STATES PATENT AND TRADEMARK OFFICE
CERTIFICATE OF CORRECTION

PATENT NO.        : 11,821,828 B1
APPLICATION NO.   : 18/069189
DATED             : November 21, 2023
INVENTOR(S)       : Naser Alsayegh and Ammar M. Bahman It is certified that error appears in the above-identified patent and that said Letters Patent is hereby corrected as shown below:

On the Title Page

Item (72), please remove the second Inventor "Amman M. Bahman" and replace with "Ammar M. Bahman".

Signed and Sealed this
Ninth Day of January, 2024

Katherine Kelly Vidal
*Director of the United States Patent and Trademark Office*